UNITED STATES PATENT OFFICE.

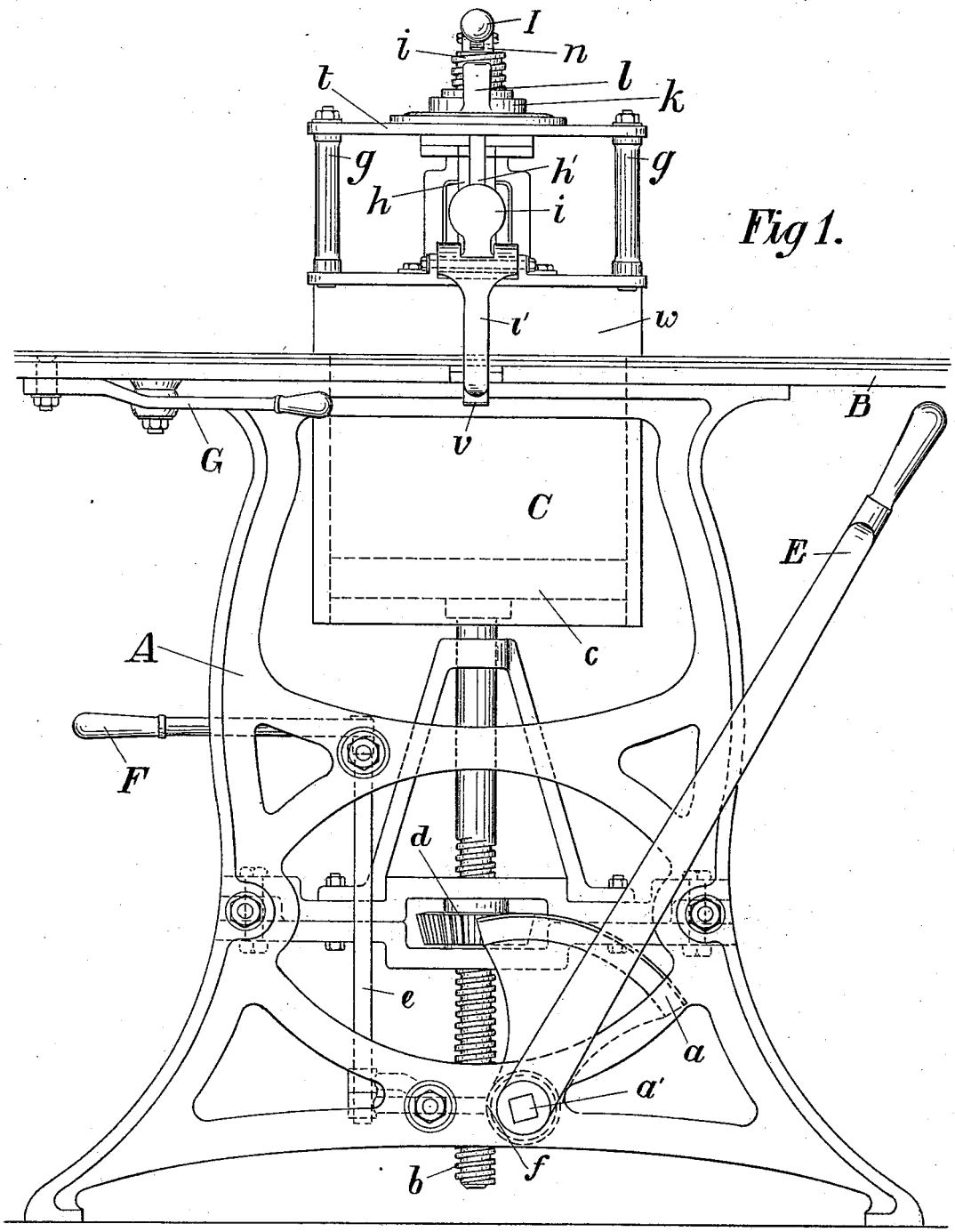

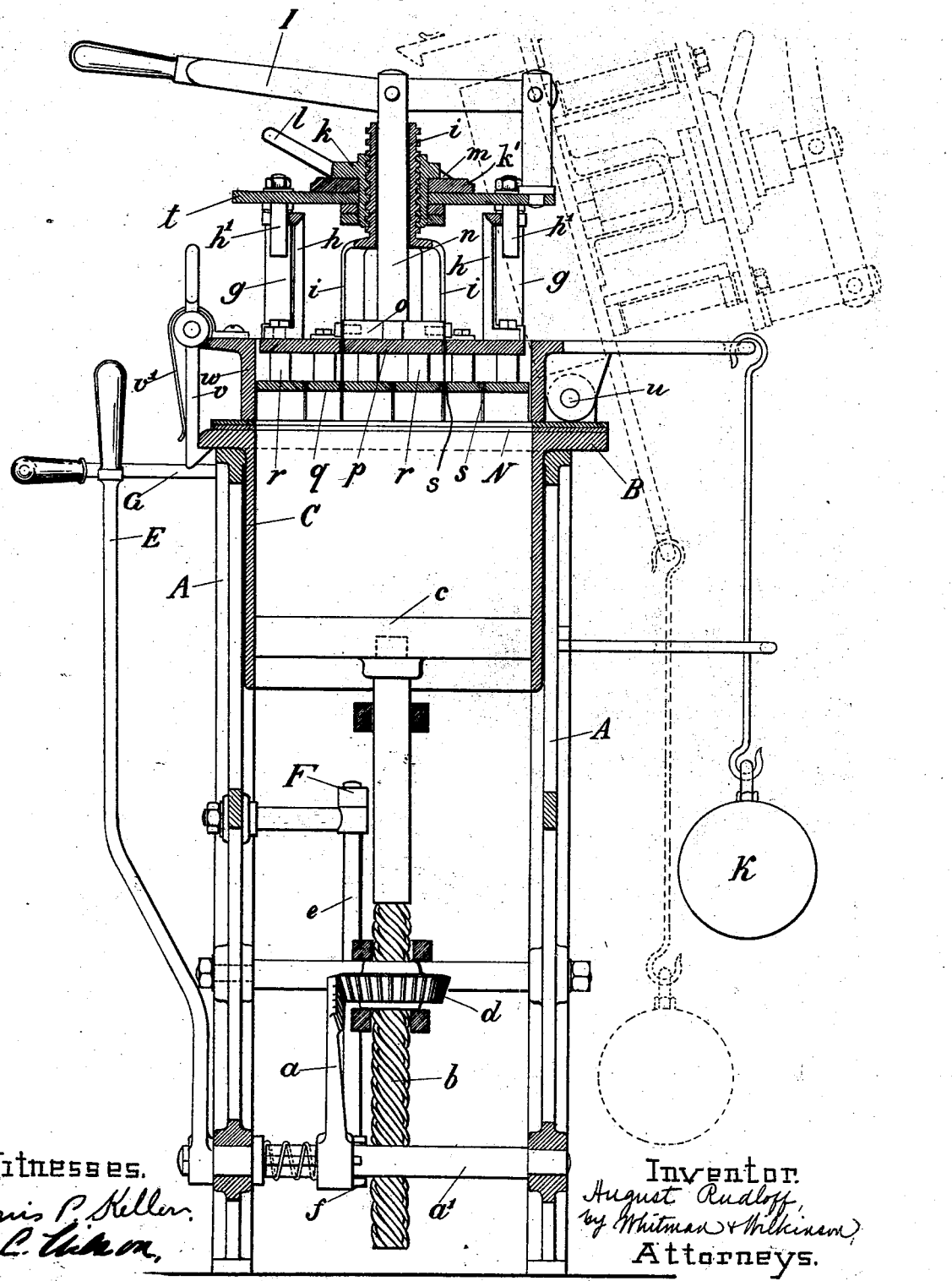

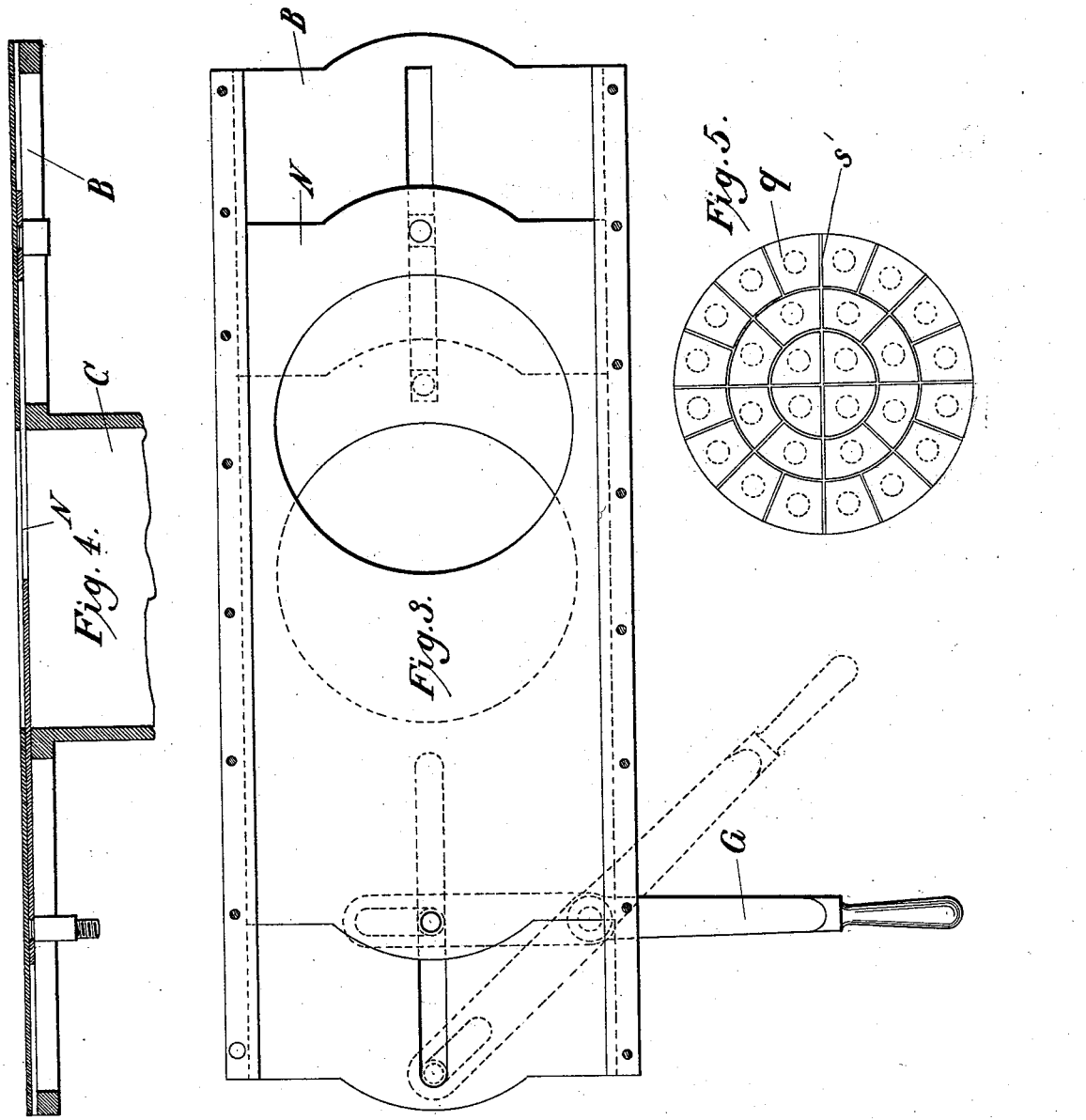

AUGUST RUDLOFF, OF HALLE-ON-THE-SAALE, GERMANY.

DOUGH-DIVIDING MACHINE.

SPECIFICATION forming part of Letters Patent No. 508,984, dated November 21, 1893.

Application filed March 2, 1893. Serial No. 464,443. (No model.)

*To all whom it may concern:*

Be it known that I, AUGUST RUDLOFF, locksmith, of Halle-on-the-Saale, in the Kingdom of Prussia and German Empire, have invented new and useful Improvements in Dough-Dividing Machines, of which the following is a specification, reference being had therein to the accompanying drawings.

Dough separating machines accomplish the otherwise tedious operation of the division of the dough for small bakers. Such machines are based generally upon the following principle: A given mass of dough is laid upon a cylinder bottom and by the downward pressure of an exactly fitting piston spread out into a layer of even thickness on the bottom. Thereupon a system of knives is pressed through the dough and the same is cut into a given number of pieces of about equal weight according to the number of knives.

The dough separating machine made in accordance with the present invention obviates the inconvenience of the hitherto necessary weighing of a mass of dough before it is put into the machine and effects an important increase in rapid delivery.

The mode of working with my dough separating machine is as follows:—The dough which is contained in a cylinder between the feet of the framework underneath the table plate is by the movement of a lever and by means of a piston pressed into the dividing space. By the movement of a second lever the mass of dough pressed into said dividing space is cut off from the rest in the cylinder by a knife and held fast thereby in the dividing space as this knife serves as a carrier for the mass of dough cut off. Thereupon a third lever at the head of the machine is pressed down and the separating knives enter into action. The quantity of the dough (which with the machines hitherto used must be weighed off before it is put on the cylinder bottom) is now determined by the size of the cutting space which is formed in continuation of the dough cylinder. The same can be increased or diminished by raising or lowering the cover plate.

Upon the accompanying drawings a dough separating machine constructed according to my present invention is shown.

Figure 1 shows the front view of the machine. Fig. 2 is a side view in cross section thereof. Fig. 3 is a view of the cutters from the top, and Fig. 4 is a longitudinal section through Fig. 3 with part of the dough cylinder shown. Fig. 5 is an inverted plan of the limiting plate.

Under the table plate B between the uprights of the frame A a cylinder C is provided which serves as a holder for the dough. The bottom of the cylinder C is formed by a piston $c$ carried by a screw spindle $b$. By the lever E the toothed segment $a$ connected with it, which gears into the bevel cog wheel $d$, can be acted upon, and thus a raising of the piston effected. In order that upon the return of the lever E into its original position the toothed segment may not act upon the toothed wheel $d$ and so avoid causing a backward (i. e. downward) motion of the piston $c$, the toothed segment is made to slide (on a "feather") upon the axle $a'$ and can by means of a lever F through shaft $e$ and forked arm or crutch $f$ be thrown out of gear with the toothed wheel $d$ while being returned to its normal position.

To the table plate B a cutting knife N is attached which slides in side grooves of the same. This is put in motion by the lever arm G and in its normal position occupies such positions respectively that it keeps the dough cylinder C either opened at the top or closed. The dividing chamber or cylinder with the dividing mechanism is fastened over the table plate B by means of hinges at $u$ in such a manner that it may be lifted, the hinge $u$ serving as a pivot therefor, to permit the introduction of the dough into the cylinder C, and the removal of the divided dough. The dividing chamber is formed by a cylinder $w$ forming a continuation of the dough cylinder C, which carries upon four columns $g\ g$ the plate $t$. Upon this plate $t$ the female screw or matrix $k$ is provided which carries a tubular screw bolt $i$. The latter holds with its four arms $a$ plate $p$ which is fastened by short stay bolts $r\ r$ to the several sections of the limiting plate $q$, contained in the head of the dividing cylinder or chamber the said limiting plate being divided (see Fig. 5) into a number of equal sections by means of slots $s'$ according to the size of the loaves into which it is desired to divide the severed portions of the dough.

When the dividing space is to be adjusted (i. e. increased or diminished) the matrix k by means of the arm l thereon is turned whereby the tubular bolt i, with plates p, and q, are moved toward or away from the cutting plate or knife N, the guiding pieces h, secured to the top of the plate p, and the bolts h', on the under surface of the plate t, sliding therethrough, serving to guide them. An index m, provided on the matrix k shows upon a scale or dial k' on the plate t, the size of the thus adjusted dividing space and the weight of dough which it is in a position to receive. Through the said tubular bolt i a shaft n passes which carries on a cross bar o, the cutting knives s which correspond in arrangement to the arrangements of the slots s' in the limiting plate q, and which are adapted upon a downward movement of the shaft n and cross bar o, (caused by means of the hand lever I,) to pass from above through the said slots s' and to divide the dough upon the knife N into a number of loaves corresponding to the sections into which the limiting plate is divided. After the dough is in this manner divided into several parts of equal weight (as already mentioned in the commencement of this description) the said separating mechanism which is hinged on hinges u is released from the catch or bolt v (acted upon by the spring v') which keeps the apparatus in its closed position whereupon the said hinged part by the force of the weight K is thrown up to about the position shown in dotted lines in Fig. 2, and leaves the separated dough upon the slide knife N.

What I claim, and desire to secure by Letters Patent of the United States, is—

1. In a dough dividing machine, the combination with a dough cylinder of a piston contained therein, a severing knife working across the said cylinder and knives moving at right angles to the severing knife, and adapted to divide the dough severed thereby and resting thereon, substantially as described.

2. In a dough dividing machine, the combination with a dough cylinder having a piston therein, of an adjustable limiting plate contained above the said cylinder, a severing knife moving across the said cylinder adjacent to the limiting plate and knives moving at right angles to the severing knife and adapted to divide the dough between it and the limiting plate, substantially as described.

3. In a dough dividing machine, the combination with a dough cylinder having a piston, of an adjustable limiting plate consisting of a series of separate sections contained above the said cylinder, a severing knife moving across the said cylinder below the said limiting plate, and knives passing between the sections of the limiting plate and toward the said severing knife, substantially as described.

4. In a dough dividing machine, the combination with a dough cylinder, having a piston therein, of a dividing cylinder hinged at the top of the dough cylinder, a knife working across and between the two cylinders, an adjustable limiting plate consisting of separate sections contained in the said dividing cylinder, and knives passing between the sections of the limiting plate and toward the said severing knife, substantially as described.

5. In a dough dividing machine, the combination with a dough cylinder having a piston therein, of a dividing cylinder hinged at the top of the dough cylinder and carrying a matrix upon its upper surface, a severing knife working across and between the said cylinders, a tubular bolt contained in the said matrix, an adjustable limiting plate consisting of separate sections hung from the said bolt, a series of knives adapted to pass between the separate sections of the limiting plate, and against the severing knife, and an index on the matrix indicating the position of the limiting plate within the dividing cylinder, substantially as described.

6. In a dough dividing machine, the combination with a dough cylinder, of a threaded piston contained therein, a beveled cogged wheel mounted thereon, a revolving spline shaft, having a rack segment thereon gearing with the said beveled cogged wheel, a clutch for sliding the said segment upon the shaft and away from the said beveled cogged wheel, a dividing cylinder hinged at the top of the said dough cylinder, a severing knife working across and between the said cylinders, a plate supported by and above the dividing chamber, a revolving matrix mounted therein, a tubular bolt passing through the said matrix, an adjustable limiting plate consisting of separate sections, each of the said sections being hung from the said bolt, a series of knives adapted to pass between the separate sections of the limiting plate and against the severing knife, and an index on the matrix moving over a scale on the plate by which it is carried and indicating the position of the limiting plate within the dividing cylinder, substantially as described.

In witness whereof I have hereunto set my hand in presence of two witnesses.

AUGUST RUDLOFF.

Witnesses:
 PAUL FISCHER,
 ROBERT MAUTIGAM.